April 6, 1954    B. E. PREVOST    2,674,163
APPARATUS FOR CONTROLLING JORDAN ENGINE PLUGS
Filed July 6, 1949
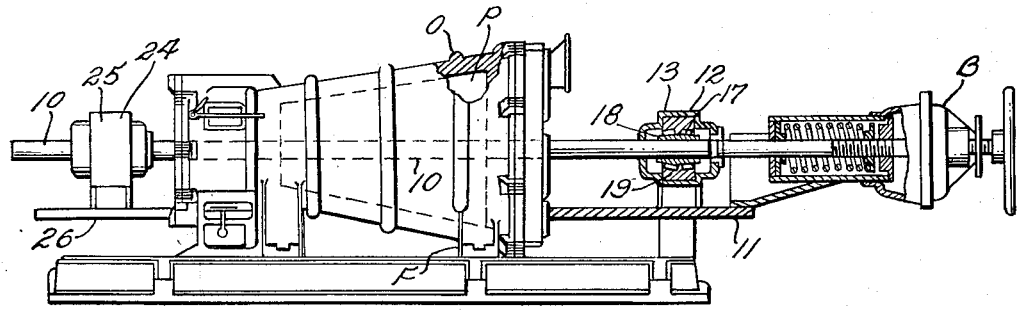
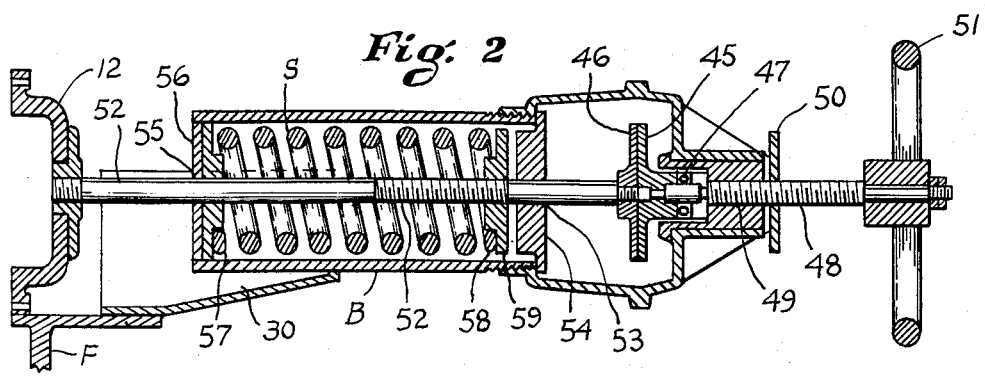
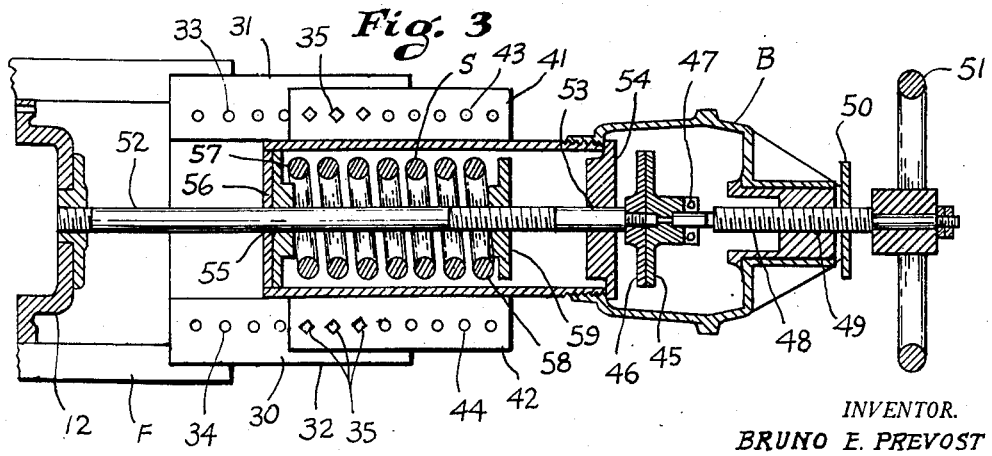
INVENTOR.
BRUNO E. PREVOST
BY
Pearson & Pearson
ATTORNEYS Patented Apr. 6, 1954

2,674,163

UNITED STATES PATENT OFFICE 2,674,163

APPARATUS FOR CONTROLLING JORDAN ENGINE PLUGS

Bruno E. Prevost, North Andover, Mass., assignor to John W. Bolton & Sons, Inc., Lawrence, Mass., a corporation of Massachusetts Application July 6, 1949, Serial No. 103,229

3 Claims. (Cl. 92—27)

This invention relates to Jordan refining engines and particularly to an improved apparatus for maintaining more accurate and more constant spacing between the revolving plug and the stationary shell of such refiners.

The space between the inwardly projecting bars or the Jordan shell and the outwardly projecting bars of the Jordan plug must remain constant in order that the bundles of paper fibres, passing between them will be uniformly separated and the fibres distributed evenly throughout the paper stock. The plug bars and shell bars are arranged for a shearing motion relative to each other. Improper spacing of the bars may cause an undesirable pulverizing or grinding effect which would damage the fibres and of course, if the plug bars approach too closely to the shell bars, the entire machine binds or freezes and great damage is done.

The revolving plug of a Jordan engine is mounted on a plug shaft and the plug shaft extends outside the shell with each end rotatably supported in thrust bearings. The thrust bearings are usually of the angular roller type and are slidable in a bearing track forming part of the main Jordan frame. Thus the bearings may be moved horizontally along the bearing track and thereby the plug may be advanced within the shell or backed off within the shell to change the spacing of the bars.

For many years the advancing and backing off mechanism of a Jordan plug has consisted of a hand wheel and thrust screw, threadedly engaging the casing of a plug bearing and rotatably mounted at the end of the bearing track and frame. The hand wheel at the end of the threaded thrust screw has been provided so that as the thrust screw is revolved in one direction, its threads cause the plug to advance and as the thrust screw is revolved in the reverse direction, its threads cause the plug to back off. The total length of travel for the plug has usually been about five to ten inches, in order that the Jordan can commence operation with bars of full height and as the surface of the bars wear down, the plug can be advanced periodically to take up the wear. Several months or years may elapse before the entire five or ten inches of travel has been used, at which time new bars are usually inserted in the plug or shell or both.

One of the causes of undesirable variation in spacing between the bars of the plug and of the shell has been the initial tolerance and subsequently developing play in the angular roller bearings supporting the plug shaft. Space is usually provided between the bearing casing and bearings to allow for expansion of the bearings and bearing raceways under heat and of course both bearings and raceways tend to wear down after use. The adjustments of a refining engine of this type are so close that this tolerance and play in the bearings can cause considerable variation in the spacing of the bars. One of the objects of my invention is to avoid the spacing variation caused by the plug shaft thrust bearings.

Another cause of undesirable spacing variation has been the threaded thrust screw which controls the movement of the plug shaft bearings. One portion of this thrust screw has usually been rotatably mounted at the end of the bearing track in roller bearings and of course these roller bearings are subject to initial tolerance and to play due to wear. The threads on the exterior of the thrust screw and on the interior of the plug shaft bearing casing are also subject to wear and may eventually be the cause of a slight reciprocation in the plug and plug shaft. Another object of my invention is therefore to prevent the development of any play and to take up all the bearing tolerances in the hand wheel control mechanism of the Jordan engine.

In my device, I remove the usual hand wheel and thrust screw mechanism from the end of the Jordan frame and install an extension to the frame, the extension having outwardly projecting flanges provided with bolt holes. I provide an elongated control housing, with similar flanges and bolt holes to register with those of the extension, so that the housing can be removed and advanced on the extension as needed. A thrust screw, having a hand wheel, at one end, is threadedly mounted at the end of my control housing and has a pusher plate at its other end, whereby the plate is advanced and returned as the hand wheel is revolved for a total travel of two or three inches.

A pushed plate, in contact with the above mentioned pusher plate, is connected to the rear central portion of the casing of the plug shaft bearing by a rod which extends along the projected longitudinal axis of the plug shaft. A helical torsion spring of great strength is mounted around the rod, with one end of the spring pushing against the end wall of the housing and the other end of the spring pushing against the pushed plate or preferably against a suitable compression adjusting member threadedly mounted on the rod.

With my new control mechanism in place, and with its thrust screw at its most retarded or backed off position, the helical coil spring pushes against the pushed plate and thus takes up all the tolerance and play in the plug shaft thrust bearings. Through the pushed plate, the spring also pushes against the pusher plate and thrust screw and thus takes up all play or tolerance therein. When the operator first turns the hand wheel to advance the plug, the ease of sliding the plug bearings in their tracks and the forces of gravity, friction and adhesion operating on the bearings and bearing raceways of the plug tend to keep the bearings and raceways from departing from their "taken up" positions. Thus as the plug is advanced the tolerance and play having been initially taken up, tends to remain so taken up and the constant urging of the spring in a back off direction prevents any play at all caused by the thrust screw portion of the mechanism.

After the plug has been advanced several inches, which may take many months, advantage is taken of a period when the Jordan is stopped and my control housing is removed and reinstalled several inches closer to the shell. The spring is allowed to expand again and the thrust screw is placed at its most retarded position in order that the cycle may be again commenced. Excessive compression of the spring is thus avoided and an opportunity is provided for the spring to again take up the play and tolerance of the plug shaft thrust bearings.

In the drawing, Fig. 1 is a side elevation on a small scale of a typical Jordan engine with the elongated control housing of this invention attached thereto.

Fig. 2 is a side elevation in section, similar to Fig. 1, showing my improved control mechanism installed on a Jordan engine and Fig. 3 is a plan view in section of the device shown in Fig. 2, with the spring compressed.

In Fig. 1, F is the frame of a Jordan engine having a plug shaft 10, and a bearing track 11 in which a rear thrust bearing 12 is slidable. Bearing 12, has a casing 13, angular roller bearings 17, inner raceways 18 and outer raceways 19. A forward thrust bearing 24 is also provided similar to bearing 12 and having a casing 25 slidable in bearing track 26. P represents the plug and O the shell of the Jordan engine.

An extension 30 is attached to frame F by suitable means such as bolting or welding, the extension 30 having outwardly projecting flanges 31 and 32 on each side containing aligned bolt holes 33 and 34. My new control housing B is provided with outwardly projecting flanges 41 and 42 having aligned bolt holes 43 and 44 so that bolts 35, 35, can initially affix housing B near the outer end of 30 and will later enable removal and reinstallation of B nearer to the frame F.

I provide a pair of buffer plates within the housing B comprising what I call the pusher plate 45 and the pushed plate 46. Plate 45 has a roller bearing connection 47 to thrust screw 48 so that the plate will not revolve while the thrust screw is revolving. Thrust screw 48 threadedly engages the housing B at 49 and is provided with a lock nut 50 and a hand wheel 51.

Plate 46 is fixed to an elongated rod 52 extending along the longitudinal axis of the plug shaft, the other end of rod 52 being attached to the rear central portion of the casing of plug shaft bearing 12 by suitable means. Rod 52 passes through an opening 53 in a partition 54 of housing B and also through an opening 55 in the end wall 56 of housing B. A helical torsion spring S is carried within housing B, around rod 52 with one end of the spring at 57 bearing against end wall 56 and the other end of the spring at 58 bearing against a disc-like member 59 threadedly mounted on rod 52. It is obvious that the end 58 of spring S could bear directly against the pushed plate 46, if desired, by eliminating disc 59 and partition 54, but by so doing the advantage of easy adjustment of the compression of spring S for various sizes of Jordan engines is lost.

Therefore, I prefer to use a member such as 59, threaded on rod 52 so that my spring S can be adjusted for Jordan plugs of various weights and the proper amount of initial compression of the spring secured.

In the position shown in Fig. 2, the control housing B is near the extremity of extension 30. The hand wheel 51 is fully unwound and spring S is exerting great pressure in the back off direction, thus taking up play and tolerance in the plug shaft bearings 12, 12 and in the thrust screw threads and roller bearings of the control mechanism. In Fig. 3, the hand wheel 51 has been revolved to advance the buffer plates 45, 46, compress the spring S, and advance the rod 52 and the plug shaft bearings 12, thus advancing the Jordan plug into the Jordan shell. The play and tolerance in plug shaft bearings 12, 12 is still taken up, because of the tendency of the bearings and raceways to remain in their taken up position by reason of inertia, friction and adhesion of the parts and the spring S is also preventing any play or tolerance in the roller bearings 47 or other parts of the mechanism of thrust screw 48.

When the travel of thrust screw 48 and plates 45, 46 has reached about the point shown in Fig. 3, and the Jordan is temporarily shut down, the hand wheel may be unwound, and the spring allowed to expand to the positions shown in Fig. 2. The bolts 35 are removed and housing B moved toward the Jordan frame and shell a distance of several inches and the bolts 35 are replaced in the new holes 33 in flange 31 of extension A. The Jordan engine may then be again placed in operation and the control mechanism used as before. When housing B has been advanced a total of five to ten inches in this manner, it is usually necessary to replace the bars of the Jordan engine.

It should be noted that the rod 52 is in the projected line of the longitudinal axis of the plug shaft 10 whereby the force applied by it to bearing 12 is parallel to track 11 and has no tendency to tip the bearing or urge the bearing out of alignment. It should also be noted that the bearing 12 is completely independent of the control housing B, the latter being spaced therefrom and not preventing easy access to the bearing. In the event of the building up of excessive back pressure at the large end of the Jordan engine, the spring S permits the plug P to yield toward the shell lining O which may have a tendency to increase the pumping action, or to slow down the plug to overcome or reduce such back pressure.

I claim:

1. In a Jordan engine having a plug shaft revolubly supported in a forward and a rear thrust bearing casing and having a track upon which said bearing casings are slidable the combination of an elongated control housing removably mounted independently of, and spaced from said rear bearing casing but in extension of the rear of said bearing track, said housing having a forward wall and a rearward wall; a rod slidably mounted in the forward wall of said control housing, said rod being fixed at one end to the rear central portion of the outside casing of said rear thrust bearing and extending along the projected longitudinal axis of said plug shaft; a pushed buffer plate fixed to the free end of said rod within said control housing; a rotatable thrust screw threadedly mounted in the rearward wall of said control housing in alignment with said rod; a pusher buffer plate revolubly mounted at the free end of said thrust screw within said control housing and in contact with said pushed buffer plate; a disc-like member threadedly mounted intermediate of said rod for revoluble adjustment to various locations lengthwise thereof and a single helical coil spring positioned around said rod between said threadedly mounted disc-like member and the forward wall of said control housing, for continually urging said member, rod, rear bearing casing, buffer plates and thrust screw in an axial back off direction and permitting yielding of said plug shaft in the opposite axial direction.

2. A device as specified in claim 1 including a pair of oppositely disposed, elongated, mounting flanges on each side of said control housing, each flange having a plurality of spaced bolt holes therealong.

3. In a Jordan engine having a plug shaft revolubly supported in a forward and a rear thrust bearing casing and having a track upon which said bearing casings are slidable, the combination of rod means fixed to the rear centre of the rear thrust bearing casing and extending along the projected longitudinal axis of said plug shaft, yielding compression spring means, encircling said rod, for continually urging said rod and bearing casing in a rearward direction and nonyielding thrust screw means, aligned with said rod and plug shaft, for gradually compressing said spring and moving said rod and plug shaft in a forward direction.

References Cited in the file of this patent
UNITED STATES PATENTS

| Number | Name | Date |
|---|---|---|
| 458,325 | Gifford | Aug. 25, 1891 |
| 1,144,305 | McCool | June 22, 1915 |
| 1,146,033 | Sorensen | July 13, 1915 |
| 1,346,277 | Storrer | July 13, 1920 |
| 1,706,944 | Wessel | Mar. 26, 1929 |
| 1,897,157 | Wells | Feb. 14, 1933 |
| 2,407,341 | Meyer | Sept. 10, 1946 |